A. C. RUTZEN.
CASING FOR DYNAMO ELECTRIC MACHINES.
APPLICATION FILED JULY 6, 1914.

1,163,265.   Patented Dec. 7, 1915.

ATTEST

INVENTOR
A. C. RUTZEN
BY Fisher ... ATT'YS

UNITED STATES PATENT OFFICE.

AUGUST C. RUTZEN, OF CLEVELAND, OHIO.

CASING FOR DYNAMO-ELECTRIC MACHINES.

1,163,265. Specification of Letters Patent. Patented Dec. 7, 1915.

Application filed July 6, 1914. Serial No. 849,233.

*To all whom it may concern:*

Be it known that I, AUGUST C. RUTZEN, citizen of the United States, residing at Cleveland, in the county of Cuyahoga and State of Ohio, have invented certain new and useful Improvements in Casings for Dynamo-Electric Machines, of which the following is a specification.

This invention appertains to a combined motor and dynamo and noise subduing inclosures for said parts, substantially as shown and described and particularly pointed out in the claim.

Figure 2:
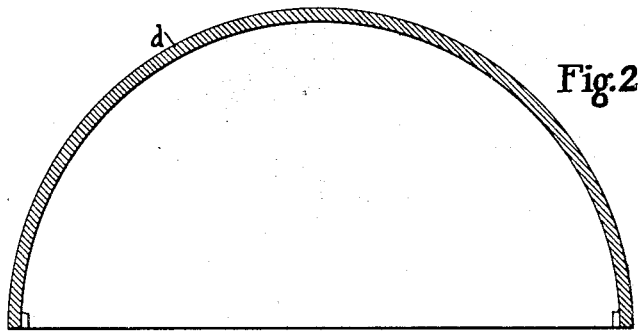
Figure 3:
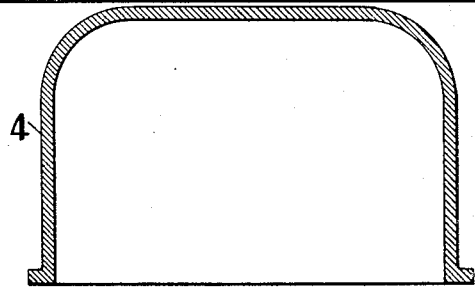
Figure 1:
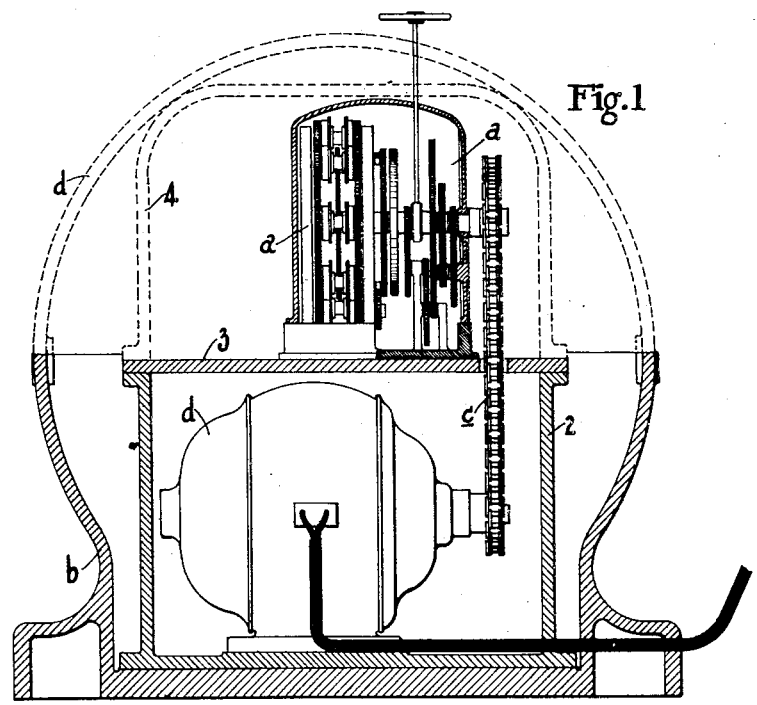

In the accompanying drawings, Figure 1 is a sectional elevation of the combined invention, and Figs. 2 and 3 are sectional elevations of outer and inner top inclosing portions, respectively, of the complete casing for the motor and dynamo.

In the drawings as thus shown the prime motor or source of power is designated as a whole by $a$, and said motor may be of any preferred kind, such as spring or compressed air or other energy, but in any event of a kind which conserves its energy for a more or less protracted run and say of the variety disclosed in my application for patent, Ser. No. 809,851, wherein there is automatic rewinding of the springs, thus extending the running of the motor over an indefinite period of time. But motors of this kind make more or less noise, and since they frequently are located in residences to generate power for electric lighting and other service, it is desirable that the noise be muffled or subdued at least to the point where it will not be of a disturbing character. Hence I have planned herein to provide a special and original housing for motors or machines of this general character whatever energy they may employ, and to this end provide also for the housing or inclosure of the dynamo $d$ therewith and which is shown as being driven from the motor by a sprocket chain $c$. In this connection it should be understood that I make no claim herein for novelty in the motor or the dynamo *per se*, nor in their combination, but exclusively and only in the double or triple inclosure therefor. These inclosures comprise the outer casing consisting of the base $b$ which is shown as of spherical contour about its side and closed to the outside air except at the slight opening for the wire cable from the dynamo drawn therethrough and completely filling the same to the exclusion of sound from the inside. The said base $b$ has a flat bottom and a special inner inclosure 2 of box shape, in this instance, which accommodates the said dynamo and has a flat cover 3 provided with small openings for the sprocket chain $c$. Any suitable inclosure which will help to muffle the sound of the dynamo may be used, but some such walled member as said box is necesssary to the invention and the suppression of the noise.

A cover $d$ of dome shape fits closely upon the edge of base $b$ and seals the same sound tight as nearly as such a casing can be made to serve this purpose, but in order to assure the object sought I place an inner cover 4 over the motor $a$ upon the inclosure 2 beneath, over or upon the flat top 3.

The plan of the invention includes the removability of the several top members 3, 4 and $d$, and the said members 4 and $d$ are shown in full lines as lifted off or removed and in dotted lines as they appear in use. I have found that by means of double inclosures of this kind with an air space between them the noise or sound of the operating parts is so completely stifled or suppressed that it ceases to be objectionable or even audible if the installation be somewhat removed from the apartments, as in the cellar.

What I claim is:

An inclosure for a motor and a dynamo consisting of an outer casing having a base and a top section seated thereon, an inner receptacle for the dynamo seated on said base and having a cover and a separate inclosure for the said motor seated on the said flat cover, the said inner parts insulated by an air space from the outer inclosing casing.

In testimony whereof I affix my signature in presence of two witnesses.

AUGUST C. RUTZEN.

Witnesses:
MYRA SCHWAN,
R. B. MOSER.